United States Patent [19]
Siegfried

[11] 3,861,052
[45] Jan. 21, 1975

[54] ELECTRONIC LEVEL INSTRUMENT
[75] Inventor: Joseph H. Siegfried, Riverside, Calif.
[73] Assignee: Silevco, Inc., Santa Monica, Calif.
[22] Filed: Mar. 13, 1972
[21] Appl. No.: 233,954

[52] U.S. Cl. .............................................. 33/366
[51] Int. Cl. ........................................... G01c 9/06
[58] Field of Search ................... 33/366, 365, 88, 89

[56] References Cited
UNITED STATES PATENTS

| | | | |
|---|---|---|---|
| 2,476,428 | 7/1949 | Nagoda | 33/366 |
| 2,511,525 | 6/1950 | Bradwell | 33/366 |
| 2,600,363 | 6/1952 | Morris | 177/311 |
| 2,789,362 | 4/1957 | Maroth | 33/366 |
| 3,172,212 | 3/1965 | Pappas | 33/366 |
| 3,204,233 | 8/1965 | Olliff | 33/366 X |
| 3,233,235 | 2/1966 | Wright | 340/282 |
| 3,241,245 | 3/1966 | Levine | 133/366 UX |
| 3,324,564 | 6/1967 | Wright et al. | 33/366 |

FOREIGN PATENTS OR APPLICATIONS

| | | | |
|---|---|---|---|
| 162,205 | 4/1921 | Great Britain | 33/366 |

*Primary Examiner*—Stanley N. Gilreath
*Assistant Examiner*—John M. Jillions
*Attorney, Agent, or Firm*—Jessup & Beecher

[57] ABSTRACT

An improved, highly sensitive, electronic level and protractor instrument is provided which is intended to replace the prior art bubble type level, as well as the prior art electric levels, and which is capable of indicating not only horizontal or vertical axes, but also axes which lie at any inclination thereto. The improved electronic level of the invention includes a pendulum which may be rotated to any desired angular position and which selectively engages a pair of contacts to activate an electronic circuit. Visual and/or aural electrical indicators are activated by the electronic circuits to indicate when the instrument is on a predetermined axis, and to indicate when the instrument is angularly displaced from the predetermined axis. Calibrated dials are provided from which the inclination of unknown axes may be determined, and which also may indicate the extent of the displacement of any particular axis from a particular inclination.

4 Claims, 7 Drawing Figures

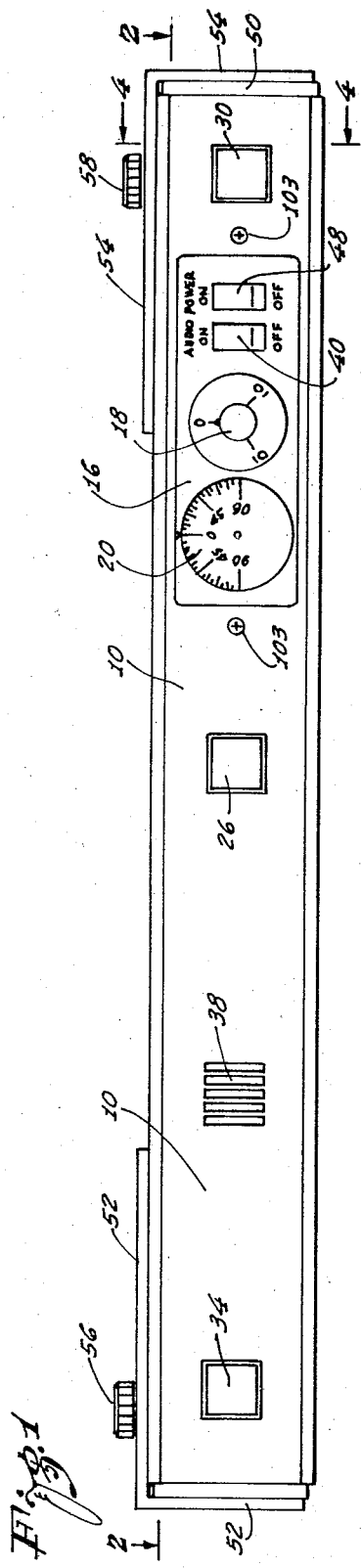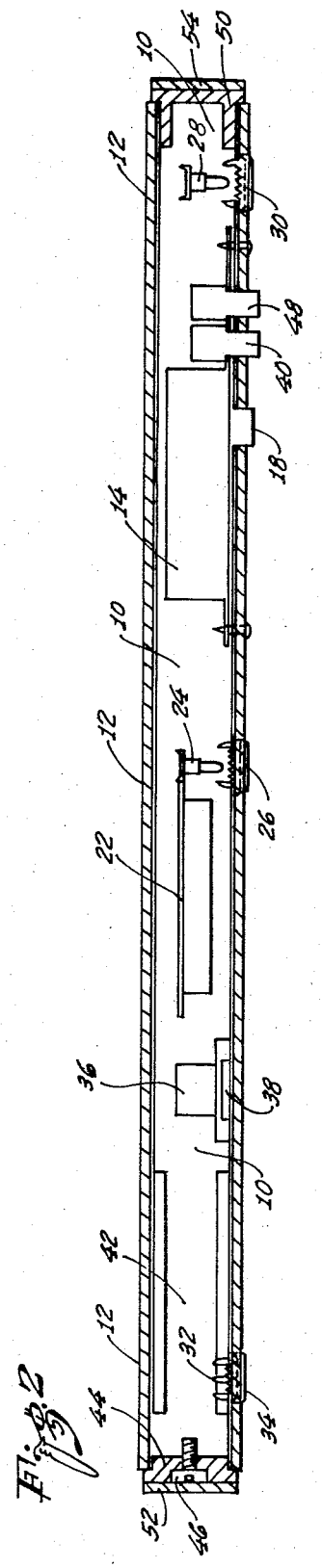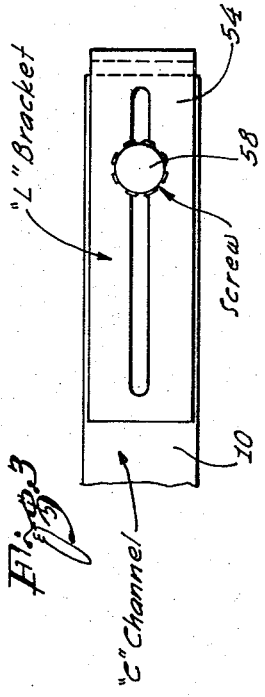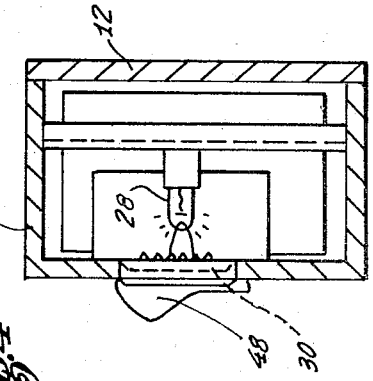

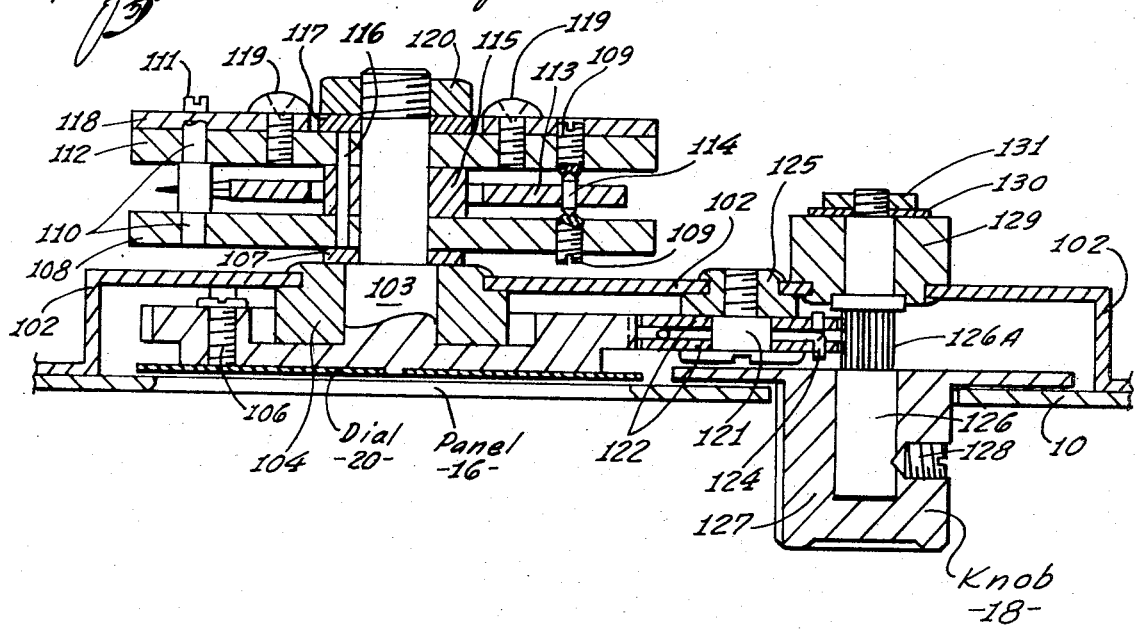
Fig. 5 (Gear Assembly)
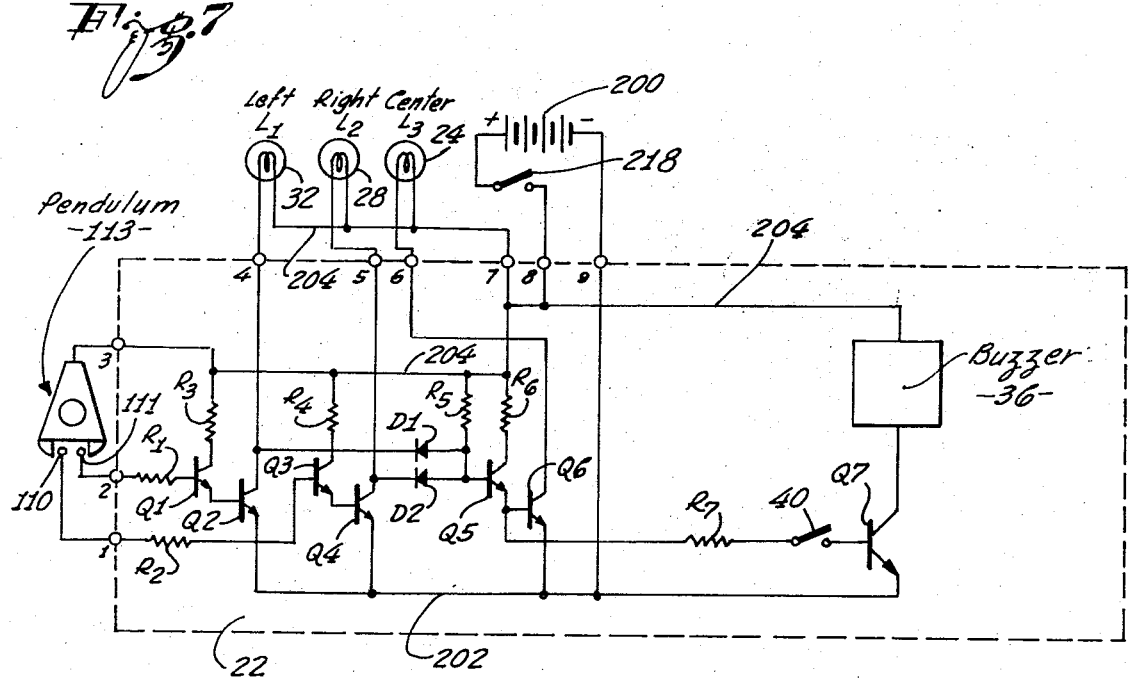
Fig. 7

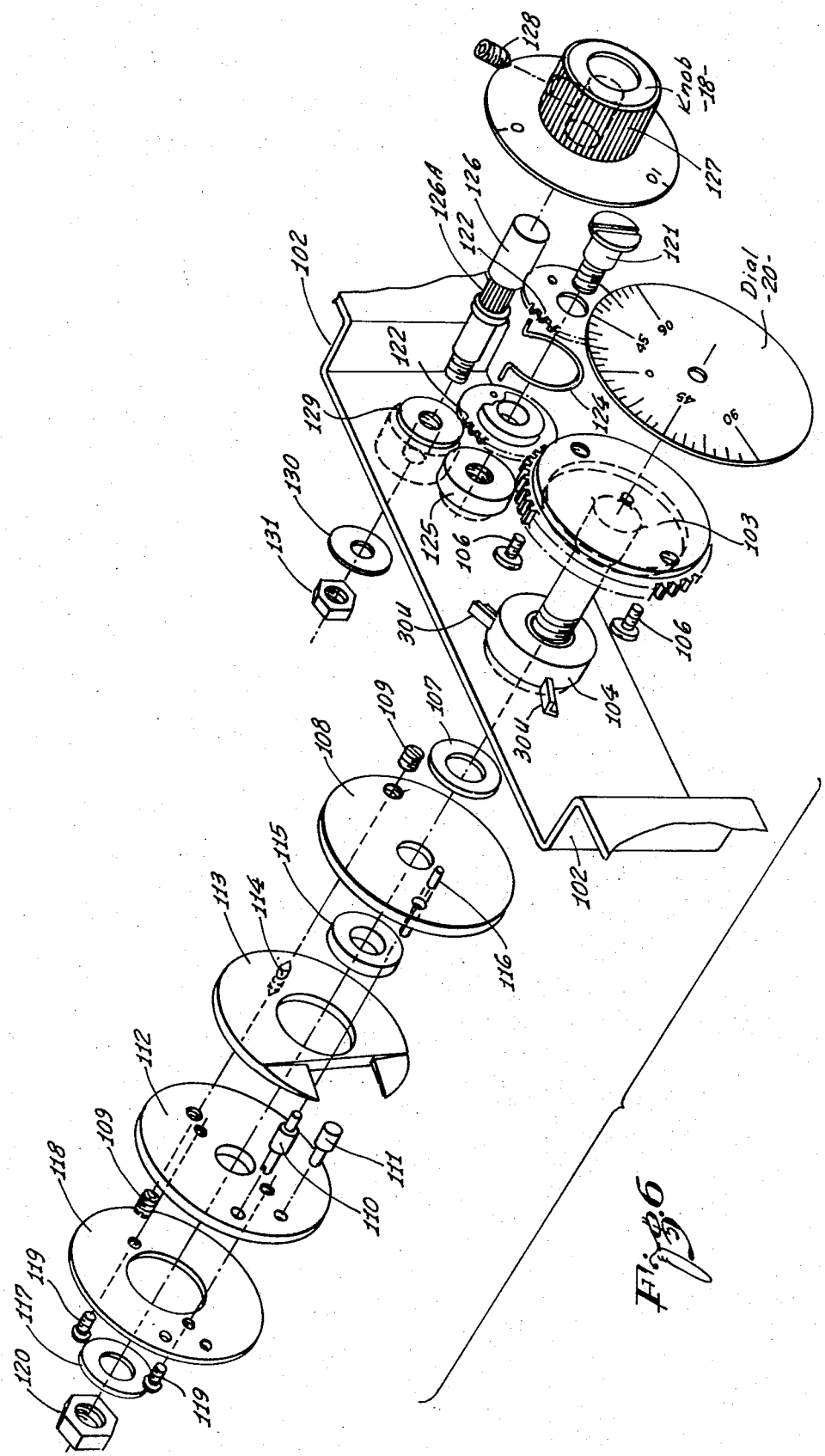

ELECTRONIC LEVEL INSTRUMENT

BACKGROUND OF THE INVENTION

The usual type of prior art instrument which has been used for many years to indicate horizontal and vertical axes is the bubble level. Various types of electric levels have also been proposed in the past. The instrument of the present invention constitutes an improvement over the prior art levels, in that it represents a self-contained solid state level instrument which is capable of precisely measuring and indicating not only vertical and horizontal axes, but also axes of any desired inclination.

As mentioned above, the instrument of the invention is constructed as a self-contained solid state assembly, and it enables a single operator easily and quickly to determine, not only when a particular axis is vertical or horizontal, but also by means of simple calibrated controls, to indicate the actual inclination of any axis with respect to the horizontal or vertical.

The instrument to be described includes an internal pendulum assembly which is coupled to the aforesaid calibrated controls through a gear assembly, and which may be turned by the calibrated controls to any desired angular position. The pendulum selectively engages electric contacts so as to activate a solid state electronic unit, as explained above, and appropriate electrical visual and/or aural indicators are selectively energized by the electronic circuit as the pendulum swings in either direction from its center position.

The embodiment to be described includes three electrical indicator lamps, the first of which is located at the center of the instrument, and the other two are located at the respective ends. When the pendulum is in its central position, for any angular adjustment of the pendulum unit by the calibrated controls, the central lamp is energized to indicate that the instrument is actually lying on an axis which is inclined to the horizontal by a precise amount indicated by the calibrated controls. If the axis on which the instrument is lying should have an inclination less than the axis indicated by the controls, one of the end lights glows, and should the inclination be greater, the other end light glows. The embodiment to be described also includes a buzzer which sounds when the predetermined axis has been achieved by the instrument. This latter indicator is most important when a single operator is using the instrument, since it obviates any need for visual observation to determine when the "level" state has been achieved.

The various elements and sub-assemblies which make up the electronic instrument of the invention are mounted within an elongated C-channel in the illustrated embodiment. The C-channel forms the frame of the instrument. As mentioned, the entire assembly is self-contained, and it is light and easy to handle. Moreover, the unit is extremely simple to operate.

BRIEF DESCRIPTION OF THE DRAWINGS

FIG. 1 is a front elevation of the instrument representing one embodiment of the invention;

FIG. 2 is a section of the instrument of FIG. 1, taken essentially along the lines 2—2 of FIG. 1;

FIG. 3 is a fragmentary top view of the instrument of FIG. 1, and showing one of a pair of L-shaped brackets which are supported at the respective ends of the C-channel;

FIG. 4 is a cross-section of the unit of FIG. 1, taken essentially along the line 4—4;

FIG. 5 is a detailed showing of a gear assembly unit which is incorporated into the instrument;

FIG. 6 is an exploded perspective view of the gear assembly unit of FIG. 5; and

FIG. 7 is a circuit diagram of an electronic circuit which is incorporated into the instrument.

DETAILED DESCRIPTION OF THE ILLUSTRATED EMBODIMENT

As shown in FIGS. 1 and 2, the improved instrument of the present invention includes an elongated C-channel 10, which may be composed of aluminum, or other appropriate metal. As best shown in FIG. 4, a back cover 12 is provided for the C-channel, so that a housing is provided for the internal components of the instrument.

A gear sub-assembly 14 is supported within the C-channel 10, and the gear sub-assembly includes a front panel 16, as best shown in FIG. 1. An actuating knob 18 is mounted on the front panel, and the knob controls an indicating dial 20 which also is mounted on the front panel. As will be described, the knob 18 is coupled to the dial 20 through appropriate gears, so that when the knob 18 is turned, the dial 20 also turns to indicate various inclinations, or angular positions, in degrees, in which the dial 20 is calibrated. The knob 18 may also be calibrated, as shown in FIG. 1, so as to act as a vernier.

Also mounted in the C-channel 10 is a printed circuit board 22 on which an appropriate electronic circuitry is mounted, such as the circuit shown in FIG. 7. A first electrical indicator lamp 24 is mounted on the circuit board 22, and the lamp 24 may be observed through the front of the C-channel 10 when it is energized, through an appropriate transparent or translucent lamp cover 26.

A second lamp 28 is mounted at one end of the C-channel 10, and it is connected to the circuitry on the circuit board 22, as is the lamp 24. The lamp 28, when illuminated, may be observed through a translucent or transparent cover 30 in the front of the C-channel 10.

A third lamp 32 is mounted at the other end of the C-channel 10, and it also is connected to the circuit on the circuit board 22. The lamp 32, when illuminated, is observable through the front of the C-channel 10, through a transparent or translucent lamp cover 34.

An electrically activated buzzer 36 is also mounted in the C-channel, and the sound transmitted by the buzzer 36, when energized, is carried through the front of the C-channel through an appropriate grill 38.

A first switch 40 is mounted on the panel 16, and may be operated selectively to connect the buzzer 36 to the circuit on the circuit board 22. A removable battery cartridge 42 is mounted at one end of the C-channel 10, and it is held in place by a cover 44 and screw 46. The screw 46 and cover 44 may be removed to permit removal of the battery cartridge 42 when new batteries are required by the unit. The batteries in the cartridge 42 supply power to the circuit on the circuit board 22, and the batteries are selectively connected to the circuit through a power switch 48 which is mounted on the panel 16.

An end cover 50 is provided at the end of the C-channel 10 remote from the battery unit 42. A first L-shaped bracket 52 is mounted on one end of the C-channel, and a second L-shaped bracket 54 is mounted on the other end. The brackets 52 and 54 are extensible, and may be turned at right angles to the C-channel 10 and set at any desired extension by respective thumb screws 56 and 58. The thumb screws extend through slots in the brackets, as shown, for example, in FIG. 3. The brackets permit the instrument conveniently to be hung from a rafter, or other member, whose inclination is to be set or determined. In this respect, permanent magnets may be provided on the C-channel 10 to permit the instrument to be firmly retained on steel girders and the like, when in use.

In the operation of the unit, the power switch 48 is turned on. The knob 18 is turned to a setting corresponding to the desired inclination of the axis being measured. The instrument is then hung or placed on that axis. If the axis is at the proper inclination, the center lamp 24 will glow, and if the switch 40 is on, the audio buzzer 36 will sound. If the inclination of the axis is less than the desired inclination, the lamp 32, for example, will glow, and if it is greater, the lamp 28, for example, will glow. In the latter case, the knob 18 may be turned until the center lamp 24 glows, and the reading on the dial 20 and knob 18 will then indicate the actual inclination of the particular axis, so that appropriate corrections may be made.

The gear assembly unit is shown in more detail in FIGS. 5 and 6. The gear assembly includes a chassis 102, which is secured to the front wall of the C-channel 10 by screws 103 (FIG. 1). The knob 18 is supported on a shaft 126 by means, for example, of a set screw 128, the shaft being rotatably supported on the chassis 102 by means of a bushing 129, a washer 130 and a nut 131, the nut being threaded to the opposite end of the shaft 126.

The shaft 126 has gear teeth formed in an intermediate section thereof, and designated 126a. These gear teeth mesh with a pair of spring loaded gears 122, which are separated by a spring 124. The gears 122 and spring 124 are rotatably supported on the chassis 102 on a central screw 121 which is threaded into a bushing 125. The gears 122 are spring loaded to prevent backlash. The gears 122 engage a main gear 103 which has a hub portion extending through the chassis 102, and which is rotatably mounted on the chassis by a bushing 104.

A pendulum holding plate 108 is supported on the hub of the gear 103 adjacent a washer 107. A collar 115 is also mounted on the hub, and the collar extends through a central opening in a pendulum 113. The second pendulum holding plate 112 is supported on the hub of the gear 103 at the other end of the collar 115, and the assembly is held in place by a nut 120, which engages a washer 117.

A terminal plate 118 is mounted on the holding plate 112 by means, for example, of screws 119. A pair of electrical contact pins 110 and 111 are mounted on the terminal plate 118, and extend through the pendulum holding plates 112 and 108.

The pendulum 113 is pivotally supported between the holding plates 108 and 112 by a pair of set screws 109 which engage a pin 114 so that the pendulum 113 is free to pivot about the axis of the pin. As the pendulum pivots, it makes selective electrical contact with the electrical contact pins 110 and 111.

A pin 116 extends from the main gear 103 through the pendulum holding plates 108 and 112, so that the pendulum may be turned to any desired angular position. The dial 20 is mounted on the main gear 103. A stop screw 106 is also mounted on the gear 103, and it engages stops 30 formed in the chassis 102, as shown in FIG. 6.

When the knob 127 is turned, it turns the shaft 126, which, in turn, turns the main gear 103 and the dial plate 20. As the main gear 103 rotates, the pin 116 causes the pendulum holding plates 108 and 112 to rotate, so that the pendulum assembly is turned to any desired angular position. Then, when the entire instrument extends along an axis corresponding to the angular position of the pendulum, the pendulum arms are out of contact with the contact pins 110 and 111. However, any angular change of the instrument from that particular axis causes the pendulum 113 to contact either the pin 110 or the pin 111, depending upon the direction of change in the angular position.

The circuit of FIG. 7 is mounted on the circuit board 22 of FIG. 2, and it is connected to the indicator lamps 24, 28 and 32, and to the buzzer 36. The circuit is controlled by the pendulum 113 as it selectively contacts the contact pins 110 and 111. The circuit is energized by a battery 200 which is contained in the battery cartridge 42 of FIG. 2.

The negative terminal of the battery 200 is connected to a common line 202. The positive terminal of the battery is connected through the power switch 48 to a line 204. One terminal of each of the lamps 24, 28 and 32, as well as the pendulum 113, are connected to the line 204.

The contact pin 110 is connected through a 33 kilo-ohm resistor R2 to the base of an NPN transistor Q3. The terminal pin 111 is connected through a 33 ohm resistor R1 to the base of an NPN transistor Q1. The transistors Q1 and Q3 may be of the type designated X3-373-Y. The collector of the transistor Q1 is connected through a 1.5 kilo-ohm resistor R3 to the line 204. The emitter of the transistor Q1 is connected to the base of an NPN transistor Q2. The transistor Q2 may be of the type designated 2SC-735-0. The collector of the transistor Q3 is connected through a 1.5 kilo-ohm resistor R4 to the line 204, and the emitter is connected to the base of an NPN transistor Q4. The transistor Q4 may also be of the type designated 2SC-73-5-0.

The collector of the transistor Q2 is connected to the other terminal of the lamp 32, and the collector of the transistor Q4 is connected to the other terminal of the lamp 28. The emitters of the transistors Q2 and Q4 are connected to the negative battery line 202.

The collector of the transistor Q2 is connected through a diode D1 to the base of an NPN transistor Q5, and the collector of the transistor Q4 is connected through a diode D2 to the base of that transistor. The base of the transistor Q5 is also connected through a 33 kilo-ohm resistor R5 to the line 204, whereas the collector is connected through a 1.5 kilo-ohm resistor R6 to the line 204.

The emitter of the transistor Q5 is connected to the base of an NPN transistor Q6, and to a resistor R7. The transistor Q6 is of the type designated 2SC-735-0. The emitter of the transistor Q6 is connected to the negative battery line 202, and the collector is connected to the other terminal of the lamp 24.

The resistor R7 is connected through the switch 40 to the base of an NPN transistor Q7, which, like the transistor Q6, may be of the type designated 2SC-73-5-0. The emitter of the transistor Q7 is connected to the line 202, and the collector is connected to one terminal of the buzzer 36. The other terminal of the buzzer is connected to the line 204.

In the circuit of FIG. 7, when the pendulum 113 is centered in the position illustrated, the transistors Q2 and Q4 are non-conductive, whereas the transistor Q6 is conductive. This causes current to flow through the center lamp 24, causing the center lamp to become illuminated. Also, if the switch 40 is closed, the buzzer 36 is, at the same time, activated.

Should the pendulum 113 engage the contact 110, the transistor Q4 becomes conductive, and the transistors Q2 and Q6 non-conductive. For this condition, the right lamp 28 is illuminated. On the other hand, should the pendulum 113 engage the contact 111, the transistor Q2 becomes conductive, and the transistors Q4 and Q6 non-conductive, so that the left lamp 32 is energized.

Therefore, the instrument operates so that the center lamp and buzzer are activated when the axis of the instrument corresponds with the axis to be measured, whereas one or the other of the end lamps 28 and 32 is energized if the inclination of the instrument is greater or less than the inclination of the desired axis.

The invention provides, therefore, a relatively simple and economical instrument which may be used for the precise measurement and indication of any particular axis. The instrument is relatively simple in its construction, and may be sold for a relatively low price. Moreover, the instrument is easy to operate, and is rugged in its construction.

While a particular embodiment of the invention has been shown and described, modifications may be made. It is intended in the following claims to cover the modifications which fall within the spirit and scope of the invention.

What is claimed is:

1. An electronic instrument for indicating the inclination of an axis, said instrument including: an elongated C-channel member; first, second and third electric indicators mounted in said channel member and observable through a side thereof, said first electrical indicator being mounted intermediate the ends of said C-channel member, and said second and third electric indicators comprising indicating lights mounted in positions displaced from the center of said C-channel member towards the respective ends thereof; an electronic circuit unit mounted in said channel member; a battery unit removably mounted in said C-channel member; a switch mounted on said C-channel member and actuable to connect electric circuitry on said electronic circuit unit to a battery in said battery unit; a gear assembly unit mounted in said channel member and including an actuating knob extending through one side of said channel member and a calibrated indicating dial observable through the side of said channel member; a pendulum mounted in said gear assembly unit for pivotal movement around a particular pivot axis; gear means included in said gear assembly unit intercoupling said actuating knob and said calibrated dial and said pendulum to enable said pendulum to be rotated about said pivot axis to selected angular positions indicated by said calibrated dial; first and second electrical contact pins mounted in said gear assembly unit to be selectively engaged by said pendulum; electric circuitry interconnecting said contact pins, said electric circuitry on said electronic circuit, and said electric indicators to cause said first indicator to be energized when the axis of said C-channel member corresponds to the selected angular position of said pendulum, and to cause said second and third indicators to be selectively energized when the inclination of the axis of said C-channel member is greater or less than the selected angular position of said pendulum.

2. The instrument defined in claim 1, and which includes an electrically activated aural unit mounted in said C-channel member, and a second switch mounted on said C-channel member for selectively connecting said aural unit to said electric circuitry.

3. The instrument defined in claim 1, in which said electronic circuit unit includes a circuit board and solid state electronic circuitry supported on said circuit board.

4. The instrument defined in claim 1, and which includes first and second extensible brackets mounted at the respective ends of said C-channel member, and corresponding first and second means for locking said brackets at selected extended positions transversely displaced from the axis of said C-channel member.

* * * * *